(12) United States Patent
Sudhakaran et al.

(10) Patent No.: US 8,614,634 B2
(45) Date of Patent: Dec. 24, 2013

(54) 8B/9B ENCODING FOR REDUCING CROSSTALK ON A HIGH SPEED PARALLEL BUS

(75) Inventors: Sunil Sudhakaran, San Francisco, CA (US); Russell R. Newcomb, Morgan Hill, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/442,772

(22) Filed: Apr. 9, 2012

(65) Prior Publication Data
US 2013/0266046 A1 Oct. 10, 2013

(51) Int. Cl.
*H03M 5/00* (2006.01)

(52) U.S. Cl.
USPC ........... 341/58; 380/28; 380/44; 370/245; 370/252; 375/257; 375/238; 375/364; 375/259; 375/340; 333/32; 333/155; 710/37; 710/57; 713/168; 713/187

(58) Field of Classification Search
USPC ........... 341/50–80; 380/28, 44; 713/168, 187; 370/245, 252; 710/37, 57; 333/32, 155; 375/257, 238, 364, 259, 340
See application file for complete search history.

(56) References Cited

U.S. PATENT DOCUMENTS

| | | | | |
|---|---|---|---|---|
| 5,565,812 A * | 10/1996 | Soenen | ............................. | 327/558 |
| 5,572,555 A * | 11/1996 | Soenen et al. | ................. | 375/364 |
| 5,598,475 A * | 1/1997 | Soenen et al. | ................. | 713/168 |
| 5,615,228 A * | 3/1997 | Soenen | ............................. | 375/238 |
| 5,832,377 A * | 11/1998 | Soenen et al. | ................. | 455/352 |
| 6,028,527 A * | 2/2000 | Soenen et al. | ................. | 340/5.26 |
| 7,248,635 B1 * | 7/2007 | Arneson et al. | ................ | 375/257 |
| 7,856,099 B2 * | 12/2010 | Brier et al. | ......................... | 380/28 |
| 8,085,172 B2 * | 12/2011 | Li et al. | ................................ | 341/58 |

* cited by examiner

Primary Examiner — Lam T Mai
(74) Attorney, Agent, or Firm — Patterson & Sheridan, L.L.P.

(57) ABSTRACT

Systems and methods for encoding/decoding a data word using an 8b/9b encoding scheme that eliminates two-aggressor crosstalk are disclosed. The 8b/9b encoding scheme enables a data word to be encoded using code words. Each of the valid code words does not include any three consecutive bits having a logic level of logic-high (i.e., '1'), and represent transition vectors for consecutive symbols transmitted over the high speed parallel bus. An encoder and corresponding decoder are disclosed for implementing the 8b/9b encoding scheme. In one embodiment, the encoder/decoder implements a modified Fibonacci sequence algorithm. In another embodiment, the encoder/decoder implements a look-up table.

20 Claims, 8 Drawing Sheets

| Decimal | Binary | Decimal | Binary |
|---|---|---|---|
| 0 | 0 0000 0000 | 16 | 0 0001 0000 |
| 1 | 0 0000 0001 | 17 | 0 0001 0001 |
| 2 | 0 0000 0010 | 18 | 0 0001 0010 |
| 3 | 0 0000 0011 | 19 | 0 0001 0011 |
| 4 | 0 0000 0100 | 20 | 0 0001 0100 |
| 5 | 0 0000 0101 | 21 | 0 0001 0101 |
| 6 | 0 0000 0110 | 22 | 0 0001 0110 |
| 7 | 0 0000 0111 | 23 | 0 0001 0111 |
| 8 | 0 0000 1000 | 24 | 0 0001 1000 |
| 9 | 0 0000 1001 | 25 | 0 0001 1001 |
| 10 | 0 0000 1010 | 26 | 0 0001 1010 |
| 11 | 0 0000 1011 | 27 | 0 0001 1011 |
| 12 | 0 0000 1100 | 28 | 0 0001 1100 |
| 13 | 0 0000 1101 | 29 | 0 0001 1101 |
| 14 | 0 0000 1110 | 30 | 0 0001 1110 |
| 15 | 0 0000 1111 | 31 | 0 0001 1111 |

400

- ☐ Valid
- ▦ Invalid 1 Aggressor
- ▨ Invalid 2 Aggressor

```
// encoding algorithm define int G [ ] = { 1, 2, 4, 7, 13, 24, 44, 81, 149 };

bool [ ] encoder (int data_word)
{
   bool d [9];

for ( i = 8; i >= 0; i--; )
   {
      if ( data_word > G[ i ] ) {
         d[ i ] = true;
         data_word = data_word - G[ i ];
      }
      else
      {
         d[ i ] = false;
      }
   } return d;

```
// decoding algorithm define int G [ ] = { 1, 2, 4, 7, 13, 24, 44, 81, 149 };

int decoder (bool [ ] transition_vector)
{
   int d = 0;

for ( i = 8; i >= 0; i--; )
   {
      if ( transition_vector[ i ] ) {
         d += G[ i ];
      }
   } return d;

8B/9B ENCODING FOR REDUCING CROSSTALK ON A HIGH SPEED PARALLEL BUS

BACKGROUND OF THE INVENTION

1. Field of the Invention

The invention relates generally to a data encoding and, more specifically, to an 8b/9b encoding scheme for reducing crosstalk on a high speed parallel bus.

2. Description of the Related Art

Many physical bus interfaces implement a high speed parallel bus architecture. For example, the JEDEC specification for GDDR5 (Graphics Double Data Rate) SGRAM (Synchronous Graphics Random Access Memory) defines a thirty-two bit wide parallel data bus (DQ<31:0>). High speed parallel bus architectures are susceptible to various signal integrity issues, including: inter-symbol interference (ISI), simultaneous switching output (SSO) noise, and crosstalk (XTalk). ISI is a form of interference where one symbol (i.e., data word) interferes with subsequent symbols transmitted over the interface during subsequent clock cycles, such as through multi-path propagation (for wireless transmission mediums) or the inherent frequency response of an Input/Output driver and transmission channel. SSO is a form of interference where the simultaneous switching of enough transistor outputs will cause a local ground potential to be higher than a board ground potential (i.e., "ground bounce") that can result in a logic-low level output at the transceiver to be interpreted as a logic-high level input at the receiver. XTalk is a form of interference where transmission of a signal on one line or circuit causes interference with a symbol transmitted on another proximate line or circuit.

The problems causes by signal integrity issues may be attenuated by taking certain precautions in the design of the circuit. The physical layout of the parallel bus trace lines may be designed to reduce coupling between the traces (e.g., by increasing the spacing between traces or by running a ground trace in between adjacent traces of the data bus). Circuit elements may be designed to actively combat signal interference such as changing capacitors and terminal resistors of the circuit, adding a pre-emphasis filter to the transceiver, or adding active noise cancellation circuitry to the circuit. However, many of these solutions add to the expense of the device (by the addition of more circuit elements) or are insufficient due to the practical limitations of the design (size restrictions). Another solution is to encode the data symbols being transmitted over the bus to limit the effects of crosstalk and SSO. For example, the data bus defined by the GDDR5 SGRAM specification implements a type of encoding called Data Bus Inversion (DBI) where the interface counts the number of low bits in a data symbol and inverts all of the bits in the data symbol if the number of low bits is above a threshold value. DBI helps with the overall power consumption of a circuit by minimizing the number of lines in the bus that are driven low.

One drawback to these techniques is that the costs associated with adding elements to the circuit are prohibitive. Modifying the design, such as by changing dimensions of traces or adding active cancellation elements, may be prohibitive. Another drawback is that conventional encoding techniques such as DBI do not adequately address signal integrity issues caused by crosstalk.

As the foregoing illustrates, what is needed in the art is an improved technique for reducing cross talk over a high speed parallel bus.

SUMMARY OF THE INVENTION

One embodiment of the present invention sets forth a computer-implemented method for reducing cross talk over a parallel bus by encoding data transmitted over the parallel bus. The method includes the steps of receiving a data word to be transmitted over a parallel bus, encoding the data word by mapping the data word to a corresponding valid code word, and transmitting the encoded data word over the parallel bus. Each valid code word is an ordered set of bits that does not include three consecutive bits having logic levels of logic-high. Transmitting the encoded data word over the parallel bus is performed by, for each transmission line of the parallel bus, if a bit of the valid code word corresponding to the transmission line has a logic level of logic-high, then switching the logic level of the transmission line during a current clock cycle based on the logic level of the transmission line during a previous clock cycle, or, if the bit of the valid code word has a logic level of logic-low, then maintaining the logic level of the transmission line during the current clock cycle based on the logic level of the transmission line during the previous clock cycle. Each bit of the valid code word is associated with a different transmission line of the parallel bus.

Another embodiment of the present invention sets forth a computer-implemented method for reducing cross talk over a parallel bus by decoding data received over the parallel bus. The method includes the steps of receiving an encoded data word that corresponds to a valid code word, and decoding the encoded data word by mapping the valid code word to a corresponding data word. Each valid code word is an ordered set of bits that does not include three consecutive bits having logic levels of logic-high. Receiving the encoded data word is performed by determining, for each transmission line of the parallel bus, whether a logic level of the transmission line during a current clock cycle is the same as a logic level of the transmission line during a previous clock cycle, and, if the logic level of the transmission line during the current clock cycle is the same as the logic level of the transmission line during the previous clock cycle, then setting a bit in the valid code word that corresponds to the transmission line to a logic level of logic-low, or if the logic level of the transmission line during the current clock cycle is not the same as the logic level of the transmission line during the previous clock cycle, then setting the corresponding bit to a logic level of logic-high, where each bit of the valid code word is associated with a different transmission line of the parallel bus Yet another embodiment of the present invention sets forth a transmitter configured to perform the encoding method described above. Still another embodiment of the present invention sets forth a receiver configured to perform the decoding method described above. Other embodiments of the present invention set forth systems that include a transmitter or a receiver coupled to a parallel bus.

One advantage of the disclosed encoding/decoding techniques is that two-aggressor crosstalk over the data bus is completely eliminated. Although, ideally, even one-aggressor crosstalk would be eliminated, the additional bits and, therefore, additional transmission lines, required to eliminate one-aggressor crosstalk is impractical due to increased size of the corresponding bus. However, even eliminating two-aggressor crosstalk while allowing one-aggressor crosstalk, which may be accomplished with a small increase in the number of transmission lines, enables the bus to be operated at higher clock frequencies by improving signal integrity.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 9A and 9B are pseudocode for a software implementation of the encoding algorithm described by the hardware of FIG. 7 and the decoding algorithm described by the hardware of FIG. 8, according to another example embodiment of the present invention;

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

In addition, throughout the specification, logic levels may be described as logic-high or logic-low to describe boolean logic represented by voltage levels. It will be appreciated that logic-high may correspond to either a source voltage level or a ground potential and logic-low may correspond to either the ground potential or the source voltage level (i.e., having the opposite potential to logic-high), depending on the particular implementation of example embodiments.

System Overview

Figure 1:
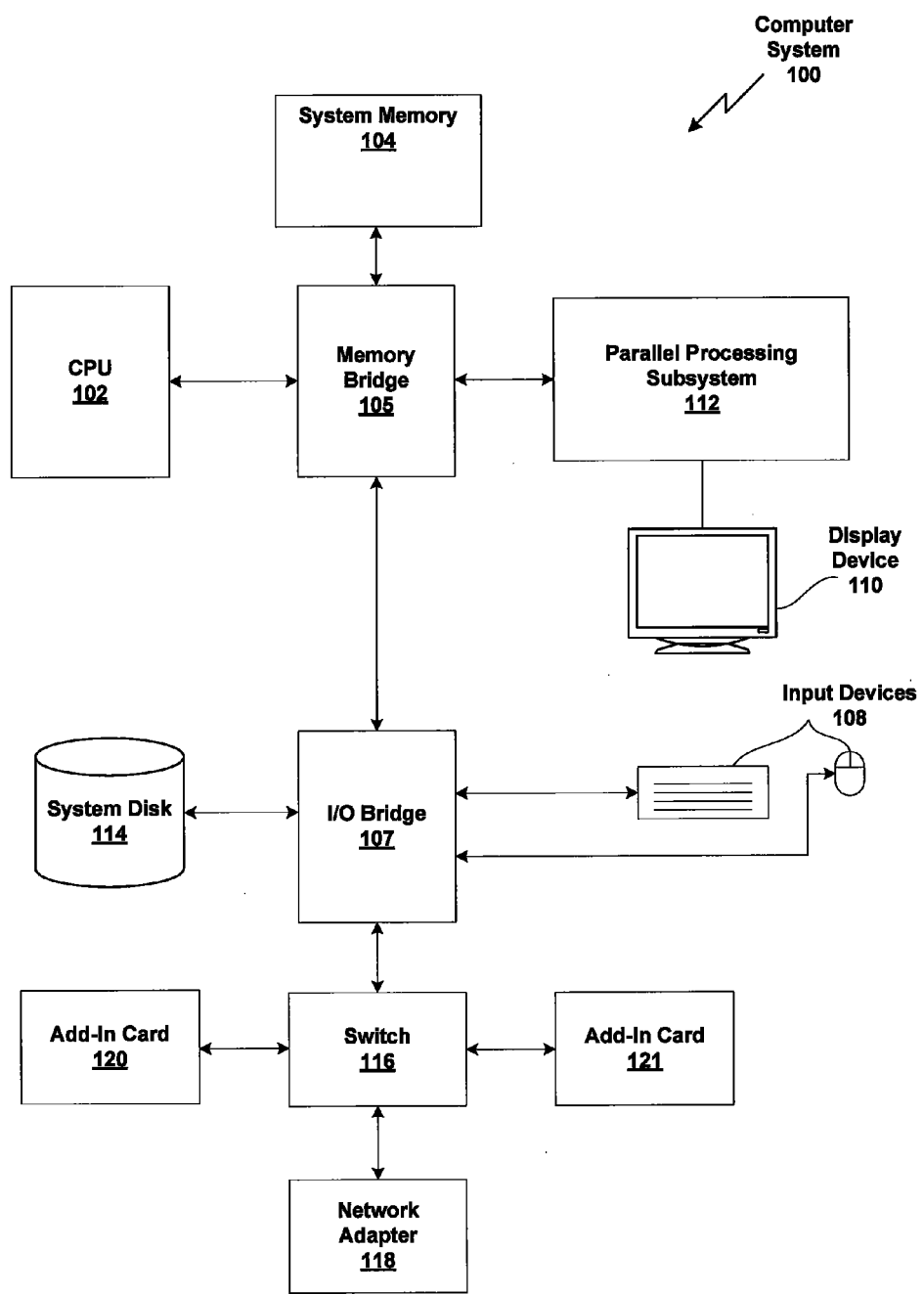
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a memory bridge 105. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via memory bridge 105. A parallel processing subsystem 112 is coupled to memory bridge 105 via a bus or other communication path (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107. Computer system 100 may be a desktop computer, a laptop computer, a tablet computer, a handheld device, a cellphone, a personal digital assistant (PDA), or some other electronic device including a processor and memory.

Figure 2:
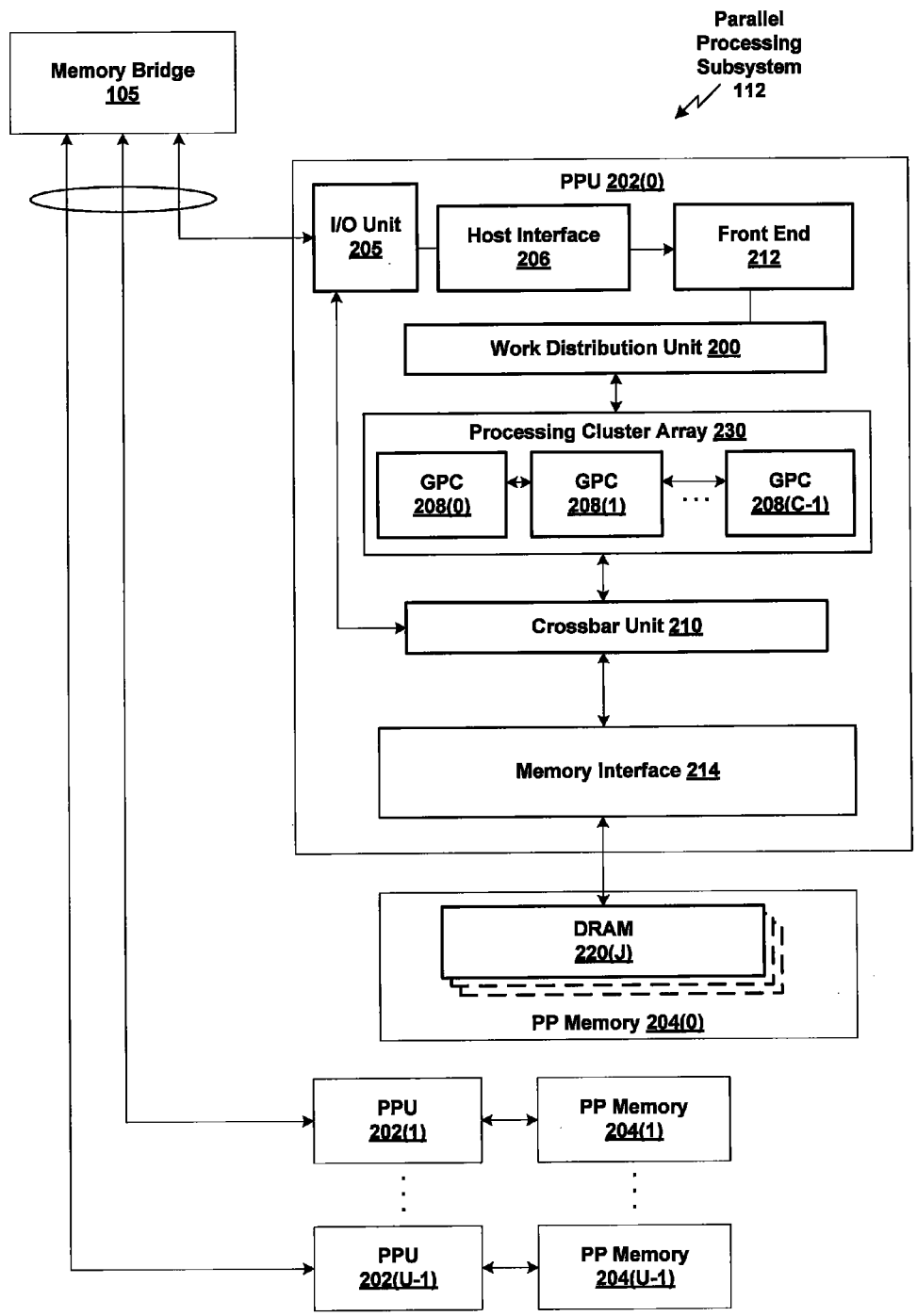
FIG. 2 illustrates a parallel processing subsystem, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105. PPU 202 is configured to interact with local parallel processing memory 204 (which can be used as graphics memory including, e.g., a conventional frame buffer) to store and update pixel data, deliver pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. A pushbuffer is a memory buffer that is accessible by both CPU 102 and PPU 202. CPU 102 writes a command stream and graphics data to the pushbuffer. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

I/O unit 205 generates packets (or other signals) for transmission to CPU 102 and also receives all incoming packets (or other signals) from CPU 102, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the push buffer is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Any one of GPCs 208 may process data to be written to any of the DRAM modules 220 within parallel processing memory 204. Crossbar unit 210 is configured to route the output of each GPC 208 to the input of the memory interface 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and memory interface 214.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204 and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to memory bridge 105, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Parallel Bus Interface

Figures 3, 4:
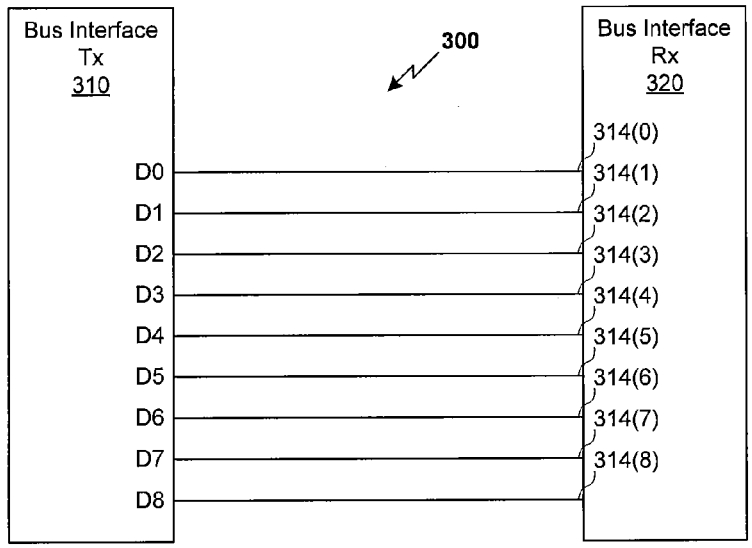
FIG. 3 illustrates a portion of a high speed parallel bus interface, according to one embodiment of the present invention.
FIG. 4 illustrates a portion of a codebook for an 8b/9b encoding scheme that reduces crosstalk on a high speed parallel data bus, according to one example embodiment of the invention.

FIG. 3 illustrates a portion of a high speed parallel bus interface 300, according to one embodiment of the present invention. As shown in FIG. 3, bus 300 includes a nine bit wide data bus 314 (D<8:0>) for transferring a single encoded eight bit data word using an 8b/9b encoding scheme, discussed in more detail below. It will be appreciated that bus 300 may be scaled to transmit encoded data words of varying widths. In some embodiments, data words less than eight bits in width may be encoded and transmitted over a bus 300 that includes a number of bits (i.e., separate and distinct traces) equal to one more than the width of the data word. For example, a five bit data word may be encoded and transmitted over a six bit bus using the 8b/9b encoding scheme. A portion of the most significant bits of the bus 300 may be omitted because smaller data words may be encoded with fewer code words. In other embodiments, data words greater than eight bits in width may be encoded and transmitted over the bus 300. For example, a sixteen bit data word may be encoded in eighteen bits, or a thirty-two bit data word may be encoded in thirty-six bits, subdividing the data word into byte sized portions and mapping each portion of the data word to a corresponding nine bit code word for transmission over the bus 300. Data words of widths that are not multiples of eight bits may be encoded by padding zeros before the most significant bit of the data word such that the width of the padded data word is a multiple of eight bits. Furthermore, data words larger than eight bits in width may also be transmitted over a 9-bit data bus by transmitting each byte of the data word in consecutive clock cycles.

In one embodiment, bus 300 may be incorporated as a portion of the communications path between memory interface 214 and DRAM module 220. For example, bus 300 may replace a portion of the parallel data bus defined by the GDDR5 SCRAM standard that implements a thirty-two bit data bus (DQ<31:0>) and a four bit Data Bus Inversion (DBI<3:0>) encoding scheme, which may be replaced by a corresponding thirty-six bit data bus that implements the 8b/9b encoding scheme disclosed herein. In such an embodiment, D<7:0> of bus 300 may replace DQ<7:0> of the GDDR5 SGRAM interface and D8 of bus 300 may replace DBI0 of the GDDR5 SGRAM interface. DQ<7:0> and DBI0 may represent one byte of the four byte GDDR5 SGRAM interface. The nine bit data bus 300 may be replicated for each additional byte of the GDDR5 SGRAM interface. In alternative embodiments, bus 300 may be implemented as a portion of any technically feasible high speed parallel bus interface. For example, bus 300 may be implemented between separate devices or modules included in the same integrated circuit (IC) or implemented between devices or modules located on different integrated circuits. In other words, the traces included in the parallel bus may be implemented internally within the same silicon substrate or may be implemented externally on a printed circuit board (PCB) between different ICs.

As shown in FIG. 3, a transmitter 310 is coupled to a receiver 320 via the high speed parallel data bus 300. It will be appreciated that bus 300 may be unidirectional or bidirectional. If bus 300 is bidirectional, then transmitter 310 and receiver 320 may be transceivers that are capable of being configured as either a transmitter or a receiver. Again, bus 300 includes a nine bit wide parallel data bus (D<8:0>) 314 for transmitting encoded data words from the transmitter 310 to the receiver 320. Although not shown explicitly, bus 300 may also include additional channels such as a high speed differential clock channel (CK/CK#), a command and address channel (CMD/ADDR), or auxiliary channels such as an error detection and correction channel (EDC).

As is well-known in the field of digital circuit design, crosstalk is a common signal integrity issue that occurs when multiple transmission lines (i.e., traces) of a high speed parallel data bus are proximate to one another. Capacitive coupling and inductive coupling between adjacent circuit elements may cause transient signals to show up on an adjacent transmission line (i.e., a "victim") when a signal is switched on a proximate trace (i.e., an "aggressor") due to changing voltage levels and the flux in the magnetic field around transmission line. For example, in FIG. 3, if bit D3 314(3) is switched from logic-high to logic-low, current may flow on the trace for bit D3 314(3), which may cause a transient current to be induced on the trace for bit D2 314(2) and/or the trace for bit D4 314(4). The transient current may affect the voltage level on the trace for bit D2 314(2) or the trace for bit D4 314(4) at the receiver 320 that can result in a loss of signal integrity if the change in voltage at the receiver 320 is large enough. Even small perturbations in the waveform at the receiver coupled to the victim trace will reduce the maximum speed at which the parallel bus can operate.

It will be appreciated that crosstalk may affect the logic level of the received data bit for a circuit. While crosstalk may cause a small amount of jitter on a particular trace that is stable at a particular logic level during two subsequent clock cycles, thus not having a large enough effect to vary the integrity of a bit that is not in transition between two subsequent clock cycles, even a small amount of jitter may affect the transition from logic-low to logic-high or from logic-high to logic-low, preventing the correct bit from being read at the receiver. At high speeds, crosstalk becomes a larger issue because switching times are decreased, thereby requiring voltage levels to transition more quickly. Thus, design of the circuit, including the physical layout of traces, may dictate a practical limit to the speed of a bus.

Deviation in timing of signal transition for a particular trace is dependent on the signals transitioning on adjacent traces. It will be appreciated that two-aggressor switching (i.e., simultaneous switching on two adjacent traces) causes a larger voltage fluctuation and, therefore, signal skew in a transitioning victim trace than one-aggressor switching (i.e., simultaneous switching on only one adjacent trace). Therefore, it would be advantageous to minimize the number of aggressors in an encoded signal.

FIG. 4 illustrates a portion of a codebook 400 for an 8b/9b encoding scheme that reduces crosstalk on a high speed parallel data bus 300, according to one example embodiment of the invention. The 8b/9b encoding scheme encodes eight bit data words using nine bit code words that represent transition vectors of the signal transmitted over bus 300 between two successive clock cycles. In other words, a code word (i.e., transition vector) represents a command to switch specific bits over bus 300. Therefore, any logic-high bit in the transition vector represents a change in state in a corresponding bit of the data bus 300 (i.e., from logic-high to logic-low or from logic-low to logic-high).

In one embodiment, a code word may be considered valid if the code word does not cause a simultaneous transition in two adjacent bits that causes one-aggressor crosstalk on the data bus 300. Therefore, '0 0000 0010' is a valid nine bit code word that results in zero-aggressor crosstalk on the data bus 300, while, in contrast, '0 0000 0011' is an invalid code word because the transitioning signals on adjacent traces for bits D0 314(0) and D1 314(1) would result in one-aggressor crosstalk on the data bus 300.

As shown in FIG. 4, the codebook 400 of nine bit code words reveals a subset of valid nine bit code words that eliminate simultaneous switching between two adjacent bits of the data bus 300. The 256 possible eight bit data words (i.e., 0-255) may be mapped to the valid code words. However, the total number of valid nine bit code words that eliminate one-aggressor crosstalk (i.e. 89) only enables 89 eight bit data words to be mapped to valid nine bit code words, which is insufficient to encode all possible eight bit data words. In order to eliminate all one-aggressor crosstalk for eight bit data words, the encoding scheme would require twelve bit wide code words in order to map each of the 256 eight bit transition vectors to a corresponding valid zero-aggressor code word. Twelve bit wide code words provide 377 valid code words for mapping the 256 eight bit data words to 256 corresponding valid twelve bit wide code words. It will be appreciated that eliminating one-aggressor crosstalk requires a significant increase in the bus width, which requires additional physical room on the silicon substrate or PCB adding cost and complexity to the design. Furthermore, merely spreading out the original eight bit bus to fit the increased footprint may have a greater effect in reducing the amount of crosstalk by changing the capacitive and inductive coupling between adjacent traces than implementing the one-aggressor encoding scheme. However, eliminating two-aggressor crosstalk while permitting one-aggressor crosstalk still has a positive effect of reducing the perturbations in the signal on the parallel bus, thereby allowing for higher speeds while maintaining signal integrity.

Returning to the codebook 400 of FIG. 4, while '0 0000 0011' is an invalid code word for an encoding scheme that eliminates one-aggressor crosstalk on the data bus 300, '0 0000 0011' is a valid code word for an encoding scheme that eliminates two-aggressor crosstalk while permitting one-aggressor crosstalk. As shown, for the first 32 code words of codebook 400, represented as decimal 0 to 31, only code words 7, 14, 15, 23, and 28-31 are invalid under the encoding scheme that eliminates two-aggressor crosstalk. In other words, 24 of the 32 code words would be valid in an encoding scheme for eliminating two-aggressor crosstalk on the data bus 300. Analysis of the full set of nine bit wide code words in codebook 400 (i.e., 512 total code words) yields 274 valid code words that eliminate simultaneous switching between three adjacent bits of the data bus 300 (i.e., two-aggressor crosstalk). Therefore, an 8b/9b encoding scheme may be implemented that maps 256 eight bit data words to 256 valid nine bit code words.

Encoding Scheme

Figure 5:
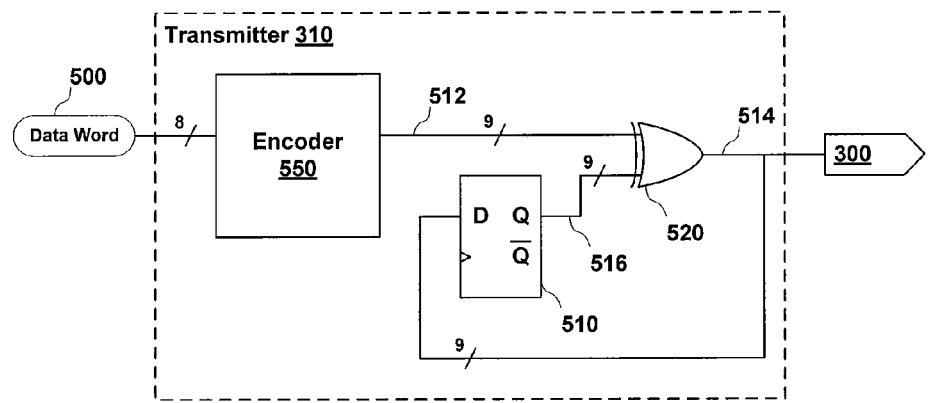
FIG. 5 illustrates a transmitter coupled to data bus and configured to convert an eight bit data word to a nine bit code word for transmission over data bus, according to one example embodiment of the invention.

FIG. 5 illustrates a transmitter 310 coupled to data bus 300 and configured to convert an eight bit data word 500 to a nine bit code word 512 for transmission over data bus 300, according to one example embodiment of the invention. As shown in FIG. 5, transmitter 310 receives a data word 500 from one or more client(s) connected to the transmitter 310. Again, transmitter 310 may be implemented directly on an IC and connected to a module (i.e., "client") implemented in the IC. For example, transmitter 310 may be connected directly to the output of memory interface 214 of PPU 202 (or may be implemented as part of the memory interface 214). Alternately, transmitter 310 may be included in an interface of each GPC 208 to transmit intermediate data between GPCs 208. In other words, transmitter 310, and encoder 550, (as well as receiver 320 and corresponding decoder 650, discussed below) are not limited in scope to implementations related to PPU 202 but, in contrast, may be implemented in relation to any high speed parallel bus. For example, transmitter 310 may be implemented in a physical interface for any client (e.g., module, chip, board, etc.) connected to a high speed parallel bus on a PCB, such as a front side bus connecting a CPU 102 to a memory bridge chipset 105 or a peripheral board such as NIC 118 to an I/O bridge chipset 107. The eight bit data word may be communicated to transmitter 310 via any technically feasible means such as an eight bit parallel bus or a serial interface into a buffer (e.g., FIFO) that aligns the serial data onto a parallel bus internal to transmitter 310.

In one embodiment, transmitter 310 includes a D flip-flop 510, an exclusive or (XOR) logic gate 520, and an encoder 550. The eight bit data word 500 is connected to the encoder 550, which converts the eight bit data word 500 into a nine bit code word 512 that represents a transition vector for bus 300. The code word 512 is connected to one input of the XOR logic gate 520. The output of the XOR logic gate 520 represents the symbol 514 transmitted over the data bus 300. The symbol 514 is transmitted over the data bus 300 by coupling the traces of the data bus 300 to a high voltage level (i.e., logic-high) or to a low voltage level (i.e., logic-low) corresponding to the bits of symbol 514, such as by coupling the most significant bit of symbol 514 to the trace for bit D8 314(8), the second most significant bit of symbol 514 to the trace for bit D7 314(7), and so forth. The symbol 514 is also fed back to the input (D) of the D flip-flop 510. The output (Q) of the D flip-flop 510, which represents the symbol 514 transmitted over data bus 300 during the previous clock cycle, is connected to a second input of the XOR logic gate 520. In operation, the XOR logic gate 520 compares the current code word 512 to the previous symbol 514 to determine which signals of the data bus 300 should be switched. It will be appreciated that the D flip-flop 510 and the XOR logic gate 520 are shown as a single 9-bit unit. However, alternative embodiments may couple each transmission line of bus 300 to separate and distinct 1-bit flip-flops and 1-bit logic gates.

Figure 6:
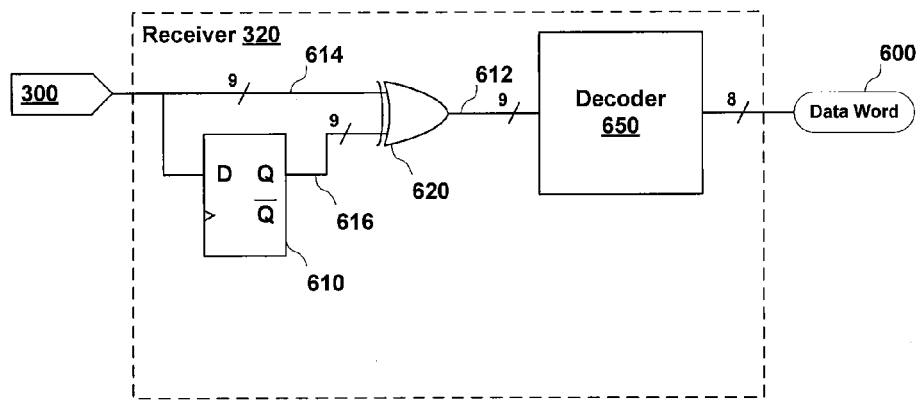
FIG. 6 illustrates a receiver coupled to data bus and configured to convert a signal received over the data bus to an eight bit data word, according to one example embodiment of the invention.

FIG. 6 illustrates a receiver 320 coupled to data bus 300 and configured to convert a symbol 614 received over data bus 300 to an eight bit data word 600, according to one example embodiment of the invention. Similar to transmitter 310, receiver 320 includes a D flip-flop 610, an exclusive or (XOR) logic gate 620, and a decoder 650. The symbol 614 (i.e., the nine bit representation of the voltage levels sampled on the data bus 300 during the transition of a clock edge) received over the bus 300 is connected to one input of the XOR logic gate 620 as well as the input (D) of the D flip-flop 610. The output (Q) of the D flip-flop 610, which represents the symbol 614 sampled during the previous clock cycle, is connected to the second input of the XOR logic gate 620. Thus, in operation, the XOR logic gate 620 generates a code word 612 based on the symbol 614 during the current clock cycle and the symbol 616 during the previous clock cycle. Again, the code word 612 represents the transition vector of bus 300. The nine bit code word 612 is connected to the decoder 650, which is configured to convert the nine bit code word 612 into a data word 600 that is the same as data word 500 encoded by the transmitter 310.

Figure 7:
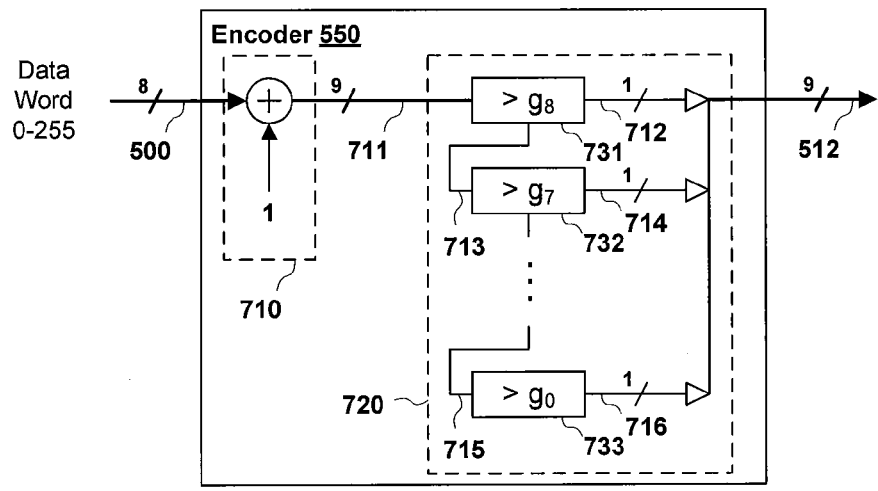
FIG. 7 illustrates an encoder for encoding an eight bit data word into a nine bit code word, according to one example embodiment of the present invention.

FIG. 7 illustrates an encoder 550 for encoding an eight bit data word 500 into a nine bit code word 512, according to one example embodiment of the present invention. As shown in FIG. 7, encoder 550 includes an adder unit 710 and a mapping unit 720. The eight bit data word 500 ranges in value from 0 to 255. The adder unit 710 adds one to the eight bit data word 500, thereby generating a nine bit data word 711 that ranges in value from 1 to 256. The nine bit data word 711 is coupled from the output of the adder unit 710 to the input of a mapping unit 720, which maps the 256 possible nine bit data words 711 to 256 valid nine bit code words 512.

In one embodiment, mapping unit 720 implements a modified Fibonacci sequence encoding scheme in order to map the nine bit data word 711 to a valid nine bit code word 512. The mapping unit 720 includes nine compare/subtraction units (CSU(s)) (e.g., 731, 732, 733, etc.) configured to compare the value connected to the input (e.g., 711, 713, 715, etc.) of the CSU to a particular encoding coefficient, G[n]. The output of the CSU (e.g., 712, 714, 716, etc.) is a bit that indicates whether the value connected to the input of the CSU is greater than the corresponding encoding coefficient G[n]. If the value connected to the input of the CSU is greater than the corresponding encoding coefficient G[n], then the CSU subtracts the corresponding encoding coefficient G[n] from the input and passes the result to the input of the next subsequent CSU (e.g., via 713, 715, etc.). However, if the value connected to the input of the CSU is less than or equal to the corresponding encoding coefficient G[n], then the CSU simply passes the value connected to the input of the CSU to the input of the next subsequent CSU. The encoding coefficient vector G is a nine element vector that represents a basis vector for the nine bit code word, shown below:

G<8:0>=[149, 81, 44, 24, 13, 7, 4, 2, 1]

In other words, the one bit outputs of the nine CSUs (e.g., 712, 714, 716, etc.) represent the valid nine bit code word 512 based on the eight bit data word 500, where bit 712 corresponds to the most significant bit of code word 512, bit 714 corresponds to the second most significant bit of code word 512, and bit 716 corresponds to the least significant bit of code word 512. Similarly, bit 712 corresponds to bit D8 314(8) of bus 300, bit 714 corresponds to bit D7 314(7) of bus 300, and bit 716 corresponds to bit D0 314(0) of bus 300. It will be appreciated that G<8:0> is the basis vector for representing the eight bit data word 500 as a Boolean representation with modified base values for each bit. For example, '0 0000 1000' represents decimal 7, '1 0000 0000' represents decimal 149, and '0 0110 0010' represents decimal 70, based on the modified basis vector G (i.e., in contrast to base-2 or binary notation in which decimal 7 is represented as "0 0000 0111').

As one example of the operation of encoder 550, for an eight bit data word 500 of '0110 1111' (i.e., decimal 111), the encoder 550 first adds one to the data word 500 to generate the nine bit data word 711 of '0 0111 0000' (i.e., decimal 112). Then the first CSU 731 determines whether the nine bit data word 711 is greater than G[8] (i.e., 149). Because 112 is less than or equal to 149, bit 712 is logic-low (i.e., 0) and the nine bit data word 711 of '0 0111 0000' (i.e., decimal 112) is passed as input 713 to the second CSU 732. Then, the second CSU 732 determines whether the nine bit input 713 of '0 0111 0000' is greater than G[7] (i.e., 81). Because 112 is greater than 81, bit 714 is logic-high (i.e., 1) and 81 is subtracted from the nine bit input 713 to generate a modified nine bit input of '0 0001 1111' (i.e., decimal 31) that is connected to the input of the next subsequent CSU. The process is repeated for all nine CSUs to generate the valid nine bit code word on bus 300. In this example, the valid nine bit code word evaluates to '0 1010 0110'.

Figure 8:
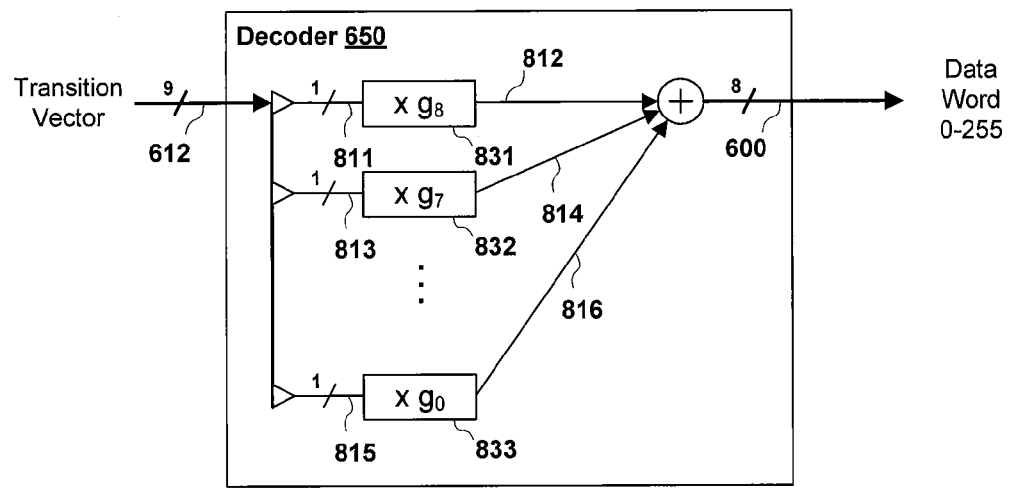
FIG. 8 illustrates a decoder for decoding a detected nine bit transition vector into an eight bit data word, according to one example embodiment of the present invention.

FIG. 8 illustrates a decoder 650 for decoding a detected nine bit transition vector 612 into an eight bit data word 600, according to one example embodiment of the present invention. As shown in FIG. 8, decoder 650 maps the detected transition vector 612 received from the XOR logic gate 620 to the data word 600, which is equal to the data word 500 encoded by encoder 550. Because the bits that switch on data bus 300 represent the bits of a basis vector G<8:0>, the data word 600 is simply equal to the sum of each of the encoding coefficients G[n] associated with a transitioning bit on data bus 300. Decoder 650 includes nine multiplication units (MULs) (e.g., 831, 832, 833, etc.) that multiply one of the input bits (e.g., 811, 813, 815, etc) from the detected transition vector 612 with the corresponding encoding coefficients G[n]. Then, the outputs (e.g., 812, 814, 816, etc.) from each of the nine MULs (e.g., 831, 832, 833, etc.) are summed to generate the data word 600.

It will be appreciated that the encoder 550 and decoder 650, described in conjunction with FIGS. 7 and 8, are merely one example implementation of an encoder/decoder for mapping eight bit data words 500 to nine bit code words 512. In alternative embodiments encoder 550 may be implemented as a look-up table (LUT) that maps each of the 256 eight bit data words 500 to a valid nine bit code word 512. In such embodiments, decoder 650 implements a corresponding LUT that maps the detected transition vector 612 to the eight bit data word 600. In yet other embodiments, other technically feasible encoding/decoding mechanisms may be implemented, so long as the set of 256 valid nine bit code words transmitted over the bus 300 do not include any nine bit code words having logic-high values in three or more consecutive bits that would cause the occurrence of two-aggressor crosstalk.

FIGS. 9A and 9B are pseudocode for a software implementation of the encoding algorithm described by the hardware of FIG. 7 and the decoding algorithm described by the hardware of FIG. 8, according to another example embodiment of the present invention. It will be appreciated that the encoder 550 and/or decoder 650 may be implemented in software in some embodiments. In such embodiments, care should be taken that the algorithm ensures that a properly encoded code word is calculated in the time between each successive clock cycle of the data bus 300. In some embodiments, multiple processors may encode multiple data words in parallel for serial output to the bus 300 in order to increase the amount of encoding throughput. Similarly, some pipelining techniques may be utilized, especially with the encoding algorithm which requires serial implementation, in order to meet timing requirements. It will be noted that the pseudocode shown in FIGS. 9A and 9B are illustrative of the modified Fibonacci encoding scheme described in FIGS. 7 and 8, and that certain embodiments may implement a software encoder/decoder using other technically feasible methods such as the aforementioned LUT implementation.

Figure 10:
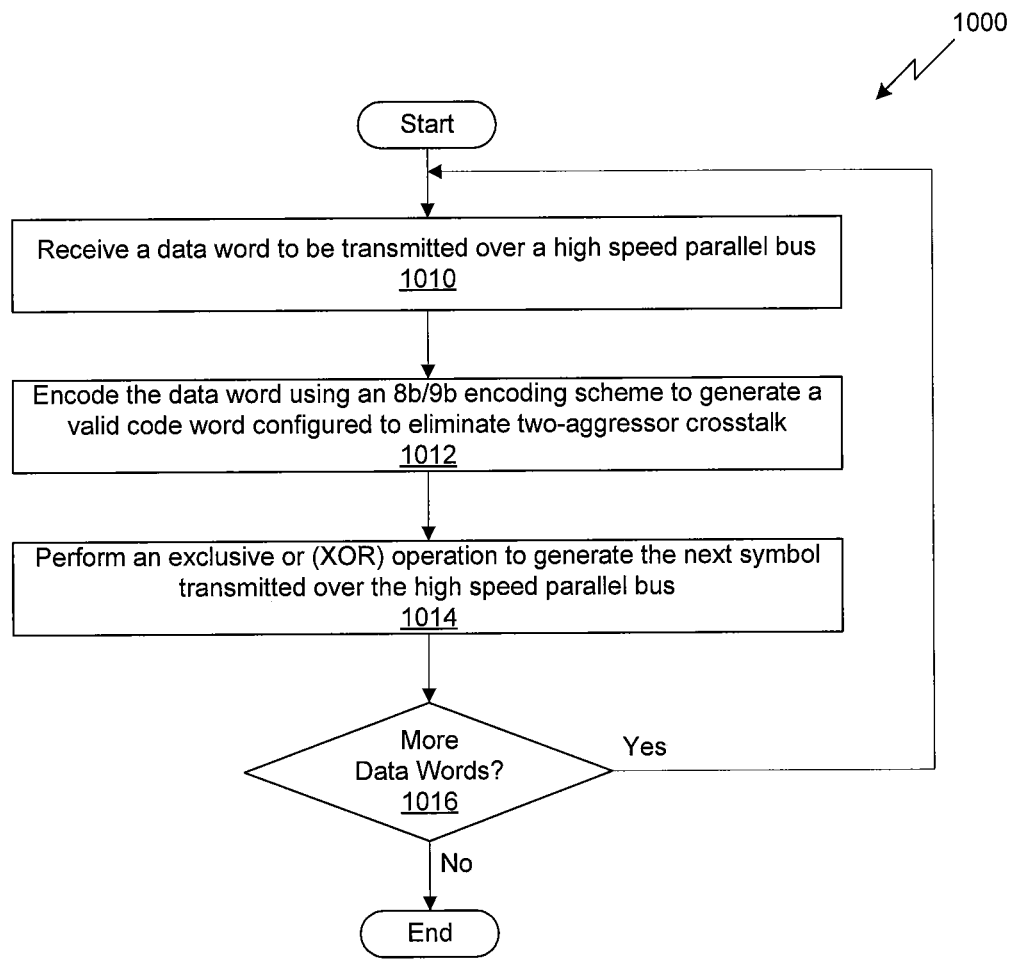
FIG. 10 sets forth a flowchart of a method for encoding a data word using an 8b/9b encoding scheme, according to one embodiment of the present invention.

FIG. 10 sets forth a flowchart of a method 1000 for encoding a data word 500 using an 8b/9b encoding scheme, according to one embodiment of the present invention. Although the method steps are described in conjunction with the systems of FIGS. 1-9B, persons skilled in the art will understand that any system configured to perform the method steps, in any order, is within the scope of the present invention.

The method begins at step 1010, where a transmitter 310 receives a data word 500 to be transmitted over a high speed parallel bus. In one embodiment, the data word is eight bits wide and has a corresponding value range between 0 and 255. At step 1012, the transmitter 310 encodes the data word 500 using an 8b/9b encoding scheme to generate a valid code word 512 that eliminates two-aggressor crosstalk over the data bus 300. Valid code words are any nine bit value that does not include three consecutive logic-high bits and, therefore, corresponds to a transition vector for bus 300 that eliminates any three adjacent traces from transitioning during the same clock period. In one embodiment, transmitter 310 implements an encoder 550 that maps the data word 500 to a code word 512 using a modified Fibonacci sequence. In another embodiment, transmitter 310 implements an encoder 550 that maps the data word 500 to a code word 512 using a LUT. At step 1014, the transmitter 310 transmits a symbol over the bus 300 by performing an XOR operation that compares the previously transmitted symbol 514 and the code word 512. At step 1016, the transmitter 310 determines if there is another data word 500 to be transmitted over bus 300. If transmitter 310 determines that there is another data word 500, then method 1000 returns to step 1010. However, if transmitter 310 determines that there is not another data word 500, then method 1000 terminates.

Figure 11:
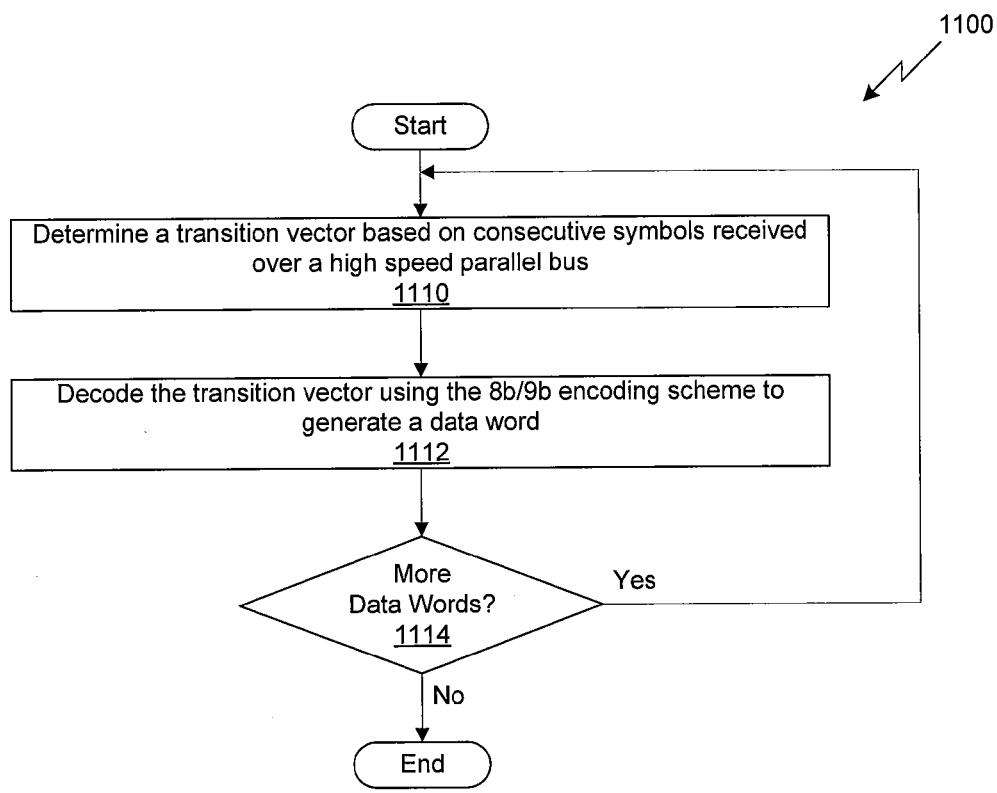
FIG. 11 sets forth a flowchart of a method for decoding a transition vector using the 8b/9b encoding scheme, according to one embodiment of the present invention.

FIG. 11 sets forth a flowchart of a method 1100 for decoding a transition vector 612 using an 8b/9b encoding scheme, according to one embodiment of the present invention. Although the method steps are described in conjunction with the systems of FIGS. 1-9B, persons skilled in the art will understand that any system configured to perform the method steps, in any order, is within the scope of the present invention.

The method begins at step 1110, where a receiver 320 determines a transition vector 612 based on consecutive symbols received over a high speed parallel bus 300. In one embodiment, the bus 300 is connected to one input of an XOR logic gate 620 as well as the input (D) of a D flip-flop 610. The output (Q) of the D flip-flop 610 is connected to the second input of the XOR logic gate 620. The output of the XOR logic gate 620 is the transition vector 612 associated with the bus 300 for the current clock period. At step 1112, the receiver 320 decodes the transition vector 612 to generate a data word 600 associated with a given transition vector 612 using an 8b/9b encoding scheme. In one embodiment, receiver 320 sums each of the encoding coefficients G[n] associated with a logic-high bit of the transition vector 612 to calculate the data word 600. In an alternative embodiment, receiver 320 implements a LUT to generate the data word 600 associated with a given transition vector 612. At step 1114, the receiver 320 determines if there is another data word 600 to be decoded that was received over the bus 300. If receiver 320 determines that there is another data word 600, then method 1100 returns to step 1110. However, if receiver 320 determines that there is not another data word 600, then method 1100 terminates.

In sum, the disclosed 8b/9b encoding/decoding technique eliminates two-aggressor crosstalk over a high speed parallel bus. By eliminating two-aggressor crosstalk, the same physical layout of the bus is capable of operating at higher speeds while still ensuring signal integrity. Further, the 8b/9b encoding scheme only requires one additional transmission line over a similar parallel bus that does not implement any type of encoding algorithm.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method for reducing cross talk over a parallel bus, the method comprising:
  receiving a data word to be transmitted over a parallel bus;
  encoding the data word by mapping the data word to a corresponding valid code word, wherein each valid code word comprises an ordered set of bits that does not include three consecutive bits having logic levels of logic-high; and
  transmitting the encoded data word over the parallel bus by:
    for each transmission line of the parallel bus, if a bit of the valid code word corresponding to the transmission line has a logic level of logic-high, then switching the logic level of the transmission line during a current clock cycle based on the logic level of the transmission line during a previous clock cycle, or
    for each transmission line of the parallel bus, if the bit of the valid code word has a logic level of logic-low, then maintaining the logic level of the transmission line during the current clock cycle based on the logic level of the transmission line during the previous clock cycle, wherein each bit of the valid code word is associated with a different transmission line of the parallel bus.

2. The method of claim 1, wherein mapping the portion of the data word to the valid code word comprises:

calculating an initial value by adding one to an integer value represented by the data word; and for each bit of the valid code word, starting with the most significant bit, performing a compare/subtract operation on an input value associated with the bit, wherein the compare/subtract operation comprises:

comparing the input value to an encoding coefficient corresponding to the bit, and if the input value is greater than the corresponding encoding coefficient, then setting the logic level of the bit to be logic-high, and setting an output value to be equal to the difference between the input value and the corresponding encoding coefficient, or if the input value is less than or equal to the corresponding encoding coefficient, then setting the logic level of the bit to be logic-low, and setting the output value to be equal to the input value, wherein, for the most significant bit of the valid code word, the input value for the compare/subtract operation is set equal to the initial value, wherein, for all other bits of the valid code word that are not the most significant bit, the input value for the compare/subtract operation is equal to the output value set during the compare/subtract operation performed for the next most significant bit, and wherein the output value set during the compare/subtract operation performed for the least significant bit of the valid code word is discarded.

3. The method of claim 2, wherein width of the data word is eight bits, and wherein the encoding coefficients for the different bits of the valid code word, having a width of nine bits, are 149, 81, 44, 24, 13, 7, 4, 2, and 1, in an order corresponding to the most significant bit to least significant bit of the valid code word.

4. The method of claim 1, wherein encoding the data word comprises mapping the data word to a corresponding valid code word based on a look-up table (LUT).

5. The method of claim 1, wherein transmitting the encoded data word over the parallel bus comprises performing an exclusive or (XOR) operation between the valid code word and a symbol transmitted over the parallel bus during a previous clock cycle.

6. The method of claim 1, wherein width of the data word is a multiple of eight bits, and each byte of the data word is mapped to a different nine bit valid code word.

7. The method of claim 1, wherein width of the data word is not a multiple of eight bits, and encoding the data word further comprises padding the data word to make the width of the padded data word a multiple of eight bits.

8. The method of claim 1, wherein the step of encoding the data word is performed by a hardware encoder coupled between a client and the parallel bus.

9. The method of claim 1, wherein the step of encoding the data word is performed by a software encoder executing on a client coupled to the parallel bus.

10. A transmitter for reducing cross talk over a parallel bus, the transmitter comprising:

logic for transmitting encoded data words over the parallel bus; and an encoder configured to encode a data word received from a client by mapping of the data word to a corresponding valid code word, wherein each valid code word comprises an ordered set of bits that does not include three consecutive bits having logic levels of logic-high, wherein the logic transmits the encoded data word over the parallel bus by:

for each transmission line of the parallel bus, switching the logic level of the transmission line during a current clock cycle based on the logic level of the transmission line during a previous clock cycle, if a bit of the valid code word corresponding to the transmission line has a logic level of logic-high, or for each transmission line of the parallel bus, maintaining the logic level of the transmission line during the current clock cycle at the logic level of the transmission line during the previous clock cycle, if the bit of the valid code word has a logic level of logic-low, wherein each bit of the valid code word is associated with a different transmission line of the parallel bus.

11. The transmitter of claim 10, wherein mapping the data word to the valid code word comprises:

calculating an initial value by adding one to an integer value represented by the data word; and for each bit of the valid code word, starting with the most significant bit, performing a compare/subtract operation on an input value associated with the bit, wherein the compare/subtract operation comprises:

comparing the input value to an encoding coefficient corresponding to the bit, and if the input value is greater than the corresponding encoding coefficient, then setting the logic level of the bit to be logic-high, and setting an output value to be equal to the difference between the input value and the corresponding encoding coefficient, or if the input value is less than or equal to the corresponding encoding coefficient, then setting the logic level of the bit to be logic-low, and setting the output value to be equal to the input value, wherein, for the most significant bit of the valid code word, the input value for the compare/subtract operation is set equal to the initial value, and wherein, for all other bits of the valid code word that are not the most significant bit, the input value for the compare/subtract operation is equal to the output value set during the compare/subtract operation performed for the next most significant bit, and wherein the output value set during the compare/subtract operation performed for the least significant bit of the valid code word is discarded.

12. The transmitter of claim 11, wherein width of the data word is a multiple of eight bits, and wherein the encoding coefficients for the different bits of the valid code word, having a width of nine bits, are 149, 81, 44, 24, 13, 7, 4, 2, and 1, in an order corresponding to the most significant bit to least significant bit of the valid code word.

13. The transmitter of claim 10, wherein encoding the data word comprises mapping the data word to a corresponding valid code word based on a look-up table (LUT).

14. The transmitter of claim 10, the logic for transmitting encoded data words over the parallel bus comprising:

a D flip-flop having a D input coupled to a transmission line of the parallel bus that corresponds to a particular bit of the valid code word; and an exclusive or (XOR) logic gate having a first input coupled to the particular bit of the valid code word, a second input coupled to a Q output of the D flip-flop, and an output coupled to the transmission line of the parallel bus that corresponds to the particular bit.

15. The transmitter of claim 14, wherein the logic for transmitting encoded data words over the parallel bus comprises a set of D flip-flops and a corresponding set of XOR logic gates, each transmission line of the parallel bus corresponding to one of the D flip-flops and one of the XOR logic gates.

16. The transmitter of claim 10, wherein the encoder comprises:
an adder configured to generate an output by adding one to an integer value represented by the data word; and
a plurality of compare/subtract units, wherein each of the compare/subtract units corresponds to a particular bit of the valid code word and is configured to:
compare an input value to an encoding coefficient corresponding to the particular bit, and
if the input value is greater than the corresponding encoding coefficient, then setting the logic level of the particular bit to be logic-high, and setting an output value to be equal to the difference between the input value and the corresponding encoding coefficient, or
if the input value is less than or equal to the corresponding encoding coefficient, then setting the logic level of the particular bit to be logic-low, and setting the output value to be equal to the input value,
wherein the compare/subtract unit corresponding to the most significant bit of the valid code word includes an input coupled to the output of the adder,
wherein, for each compare/subtract unit corresponding to all bits of the valid code word that are not the most significant bit, the input value of the compare/subtract unit is coupled to the output value of the compare/subtract unit corresponding to the next most significant bit, and
wherein, for the compare/subtract unit corresponding to the least significant bit of the valid code word, the output value is discarded.

17. The transmitter of claim 10, wherein the encoder comprises a software encoder executing in a processing unit coupled to the parallel bus.

18. A system for reducing cross talk over a parallel bus, the system comprising:
a processor;
a memory;
a parallel bus; and
a transmitter coupled to the one side of the parallel bus, the transmitter comprising:
logic for transmitting encoded data words over the parallel bus, and
an encoder configured to encode a data word received from a client by mapping the data word to a corresponding valid code word,
wherein each valid code word comprises an ordered set of bits that does not include three consecutive bits having logic levels of logic-high,
wherein the logic transmits the encoded data word over the parallel bus by:
for each transmission line of the parallel bus, switching the logic level of the transmission line during a current clock cycle based on the logic level of the transmission line during a previous clock cycle, if a bit of the valid code word corresponding to the transmission line has a logic level of logic-high, or
for each transmission line of the parallel bus, maintaining the logic level of the transmission line during the current clock cycle at the logic level of the transmission line during the previous clock cycle, if the bit of the valid code word has a logic level of logic-low,
wherein each bit of the valid code word is associated with a different transmission line of the parallel bus.

19. The system of claim 18, wherein mapping the data word to the valid code word comprises:
calculating an initial value by adding one to an integer value represented by the data word; and
for each bit of the valid code word, starting with the most significant bit, performing a compare/subtract operation on an input value associated with the bit, wherein the compare/subtract operation comprises:
comparing the input value to an encoding coefficient corresponding to the bit, and
if the input value is greater than the corresponding encoding coefficient, then setting the logic level of the bit to be logic-high, and setting an output value to be equal to the difference between the input value and the corresponding encoding coefficient, or
if the input value is less than or equal to the corresponding encoding coefficient, then setting the logic level of the bit to be logic-low, and setting the output value to be equal to the input value,
wherein, for the most significant bit of the valid code word, the input value for the compare/subtract operation is set equal to the initial value, and
wherein, for all other bits of the valid code word that are not the most significant bit, the input value for the compare/subtract operation is equal to the output value set during the compare/subtract operation performed for the next most significant bit, and
wherein the output value set during the compare/subtract operation performed for the least significant bit of the valid code word is discarded.

20. The system of claim 18, wherein the transmitter comprises a transceiver.

* * * * *